US012692923B2

(12) United States Patent
Tsai

(10) Patent No.: US 12,692,923 B2
(45) Date of Patent: Jul. 28, 2026

(54) ISOLATION ENERGY ABSORBER

(71) Applicant: Chong-Shien Tsai, Scottsdale, AZ (US)

(72) Inventor: Chong-Shien Tsai, Scottsdale, AZ (US)

( * ) Notice: Subject to any disclaimer, the term of this patent is extended or adjusted under 35 U.S.C. 154(b) by 404 days.

(21) Appl. No.: 18/376,052

(22) Filed: Oct. 3, 2023

(65) Prior Publication Data

US 2024/0117851 A1 Apr. 11, 2024

(30) Foreign Application Priority Data

Oct. 7, 2022 (TW) .................................. 111138169

(51) Int. Cl.
F16F 7/00 (2006.01)
E04H 9/02 (2006.01)
(52) U.S. Cl.
CPC ................ F16F 7/00 (2013.01); E04H 9/021 (2013.01); F16F 2224/0208 (2013.01); F16F 2230/40 (2013.01); F16F 2234/02 (2013.01)
(58) Field of Classification Search
CPC .. F16F 7/00; F16F 2224/0208; F16F 2230/40; F16F 2234/02; E04H 9/021
USPC .................... 52/167.1, 167.7; 248/566, 575; 267/140.2, 140.4, 141.1, 292–294
See application file for complete search history.

(56) References Cited

U.S. PATENT DOCUMENTS

| | | | |
|---|---|---|---|
| 4,713,917 A | 12/1987 | Buckle et al. | |
| 4,789,586 A | 12/1988 | Morimura et al. | |
| 5,655,756 A | 8/1997 | Robinson | |
| 9,771,997 B2 * | 9/2017 | Tsai ........................... | F16F 7/08 |
| 9,945,116 B2 * | 4/2018 | Tsai ........................ | F16F 7/087 |
| 2015/0361656 A1 * | 12/2015 | Miyazaki ................ | E04H 9/022 |
| | | | 164/75 |

FOREIGN PATENT DOCUMENTS

| | | | | | |
|---|---|---|---|---|---|
| CN | 101073823 A | * | 11/2007 | ............. | B22D 17/02 |
| CN | 109072574 B | | 6/2020 | | |
| CN | 218622727 U | | 3/2023 | | |
| EP | 2894365 A1 | | 7/2025 | | |
| JP | 2003-21193 A | | 1/2003 | | |
| JP | 2006-226414 A | | 8/2006 | | |
| JP | 2006275213 A | | 10/2006 | | |
| JP | 2006275215 A | | 10/2006 | | |
| JP | 2007139108 A | * | 6/2007 | ............. | F16F 15/04 |
| JP | 2010203592 A | | 9/2010 | | |
| JP | 2013108562 A | | 6/2013 | | |
| JP | 2016169770 A | | 9/2016 | | |
| TW | M270283 U | | 7/2005 | | |
| TW | I599707 B | | 9/2017 | | |
| TW | 201819739 A | | 6/2018 | | |
| TW | I627336 | | 6/2018 | | |

(Continued)

*Primary Examiner* — Christopher P Schwartz
(74) *Attorney, Agent, or Firm* — WPAT, PC

(57) ABSTRACT

An isolation energy absorber has at least one core post, two supporting boards, multiple first material layers, and multiple second material layers. The at least one core post is a columnar body and is made of zinc metal or zinc alloy that has been metal smelted to have a shear strain capacity of at least 50%. The two supporting boards are respectively disposed on two ends of the isolation energy absorber at a spaced interval. The first material layers and the second material layers are alternately mounted between the two supporting boards and surround the at least one core post.

31 Claims, 17 Drawing Sheets

Horizontal Force (kN)

Relative Horizontal Displacement (mm)

Characteristic Strength

(56)     References Cited

FOREIGN PATENT DOCUMENTS

| TW | I627336 | B | 6/2018 |
| TW | I739861 | | 9/2021 |
| TW | I750200 | | 12/2021 |
| WO | 2019175310 | A1 | 9/2019 |

* cited by examiner

ISOLATION ENERGY ABSORBER

BACKGROUND OF THE INVENTION

1. Field of the Invention

The present invention relates to an energy absorber, and more particularly to an isolation energy absorber that is used on buildings, bridges, other large objects, facilities or equipment to absorb and isolate the vibration energy of the earthquake and the environment, can be recrystallized at room temperature after an earthquake to avoid strain hardening and maintain complete functionality, can prevent the operation temperature from increasing and avoid the weakening of structural strength due to the high specific heat during earthquakes, and can provide a preferred shock-absorbing effect.

2. Description of Related Art

Conventional energy absorbers are commonly mounted on large objects, such as buildings, bridges or machines to provide shock-absorbing and shock-suppressing effects to the objects and to absorb the energy and shocks generated during earthquakes. U.S. Pat. No. 5,655,756 (hereinafter referred to as the referenced case) discloses that a conventional energy absorber (Lead Rubber Bearing, LRB) comprises a core post, two supporting boards, multiple metal layers, and multiple rubber layers. The two supporting boards are mounted respectively on two ends of the core post, and are securely connected to the ground and a large object respectively. The metal layers and the rubber layers are alternately mounted between the two supporting boards. When an earthquake occurs, a shock-absorbing effect can be provided by the deformations of the metal layers, the rubber layers, and the core post to reduce the damage done by the earthquake.

However, the core post of the conventional energy absorber of the referenced case is made of lead. The lead core post may be deformed during the earthquake to absorb the vibration energy of the earthquake, and the deformation of the lead core post will generate heat. Lead is a toxic heavy metal that will impact the environment, and has a melting point about 327° C. and a lower specific heat. Therefore, the temperature of the lead core post of the referenced case will rise over 300° C. which easily exceeds the melting point of lead by the repeated deformation during the earthquake, and the high temperature easily damages the functions of the core post and the rubber layers or even melts the core post and the rubber layers to damage the functions of the conventional energy absorber, reduce the energy absorption efficiency, and even destroy the conventional energy absorber, thereby destroying the structure of the conventional energy absorber and affecting its supporting strength. In addition, even if the temperature does not reach the melting point of lead, the materials (including lead and rubber) are also softened by the temperature, and this will reduce the structural strength and cause excessive displacement of the conventional energy absorber, and the supporting ability and the shock-absorbing effects of the conventional energy absorber are also reduced.

Additionally, although tin is used as a material for manufacturing the core posts in current academic research, tin has at least the following shortcomings and problems in its use:

First, although the toxicity of tin is lower than that of lead (neurotoxicity), it is still toxic and will still impact the environment.

Second, the melting point of tin is about 232° C., which is much lower than the melting point of lead. Therefore, during an earthquake, tin is more likely to damage the function of the core post or even melt, causing damage to the entire function of the conventional energy absorber, reducing its energy absorption efficiency, and even damages the structure of the conventional energy absorber and affects its supporting strength.

Third, when the temperature of tin is below 13.2° C., tin will transform from β-form to α-form gray tin and turn into powder, causing irreversible damage and thus losing its function.

Fourth, the amount of tin on the earth is too small and it is estimated to be used up in about 20 to 40 years. Therefore, tin is quite expensive and difficult to obtain.

In view of the above-mentioned problems and shortcomings of the conventional energy absorber, the energy absorber that is made of lead has gradually been banned or renounced from use. The world has been thinking about other shock-absorbing materials or energy absorption mechanism by which it needs to solve the energy absorption, the environmental protection, and other issues. One of the solutions is to remove the lead core post, but the shock-absorbing effect will be inadequate and this will cause the energy absorber to have too large displacement. If the conventional energy absorber is used with other dampers such as a hydraulic damper, the cost is expensive. In addition, it is not only expensive, but also requires a large space to accommodate the conventional energy absorber and the other dampers, and this will cause problems of use. Furthermore, the conventional energy absorber with the tin core post also have the above-mentioned shortcomings and problems in use. Therefore, the conventional energy absorbers need to be improved.

To overcome the shortcomings, the present invention tends to provide an isolation energy absorber to mitigate or obviate the aforementioned problems.

SUMMARY OF THE INVENTION

The main objective of the invention is to provide an isolation energy absorber having a core post, two supporting boards, multiple first materials, and multiple second materials. The core post is made of zinc metal or zinc alloy that has been metal smelted to be a ductile material with a shear strain capacity of at least 50%. The isolation energy absorber can provide a shock-absorbing effect by deformation of the core post, the first materials, and the second materials. The non-lead core post can prevent the operation temperature of the isolation energy absorber from increasing to damage the functions of the core post or even melting the core post and from impacting the environment. The present invention provides an isolation energy absorber that is environmentally friendly, has good damping effect, maintains complete functions, suppresses temperature rise, and has a preferred shock-absorbing effect.

The isolation energy absorber in accordance with the present invention has at least one core post, two supporting boards, multiple first material layers, and multiple second material layers. The at least one core post is a columnar body and is made of zinc metal or zinc alloy that has been metal smelted to have a shear strain capacity of at least 50%. The two supporting boards are respectively disposed on two ends of the isolation energy absorber at a spaced interval. The first material layers and the second material layers are alternately mounted between the two supporting boards and surround the at least one core post.

Other objects, advantages and novel features of the invention will become more apparent from the following detailed description when taken in conjunction with the accompanying drawings.

DETAILED DESCRIPTION OF PREFERRED EMBODIMENT

Figure 1:
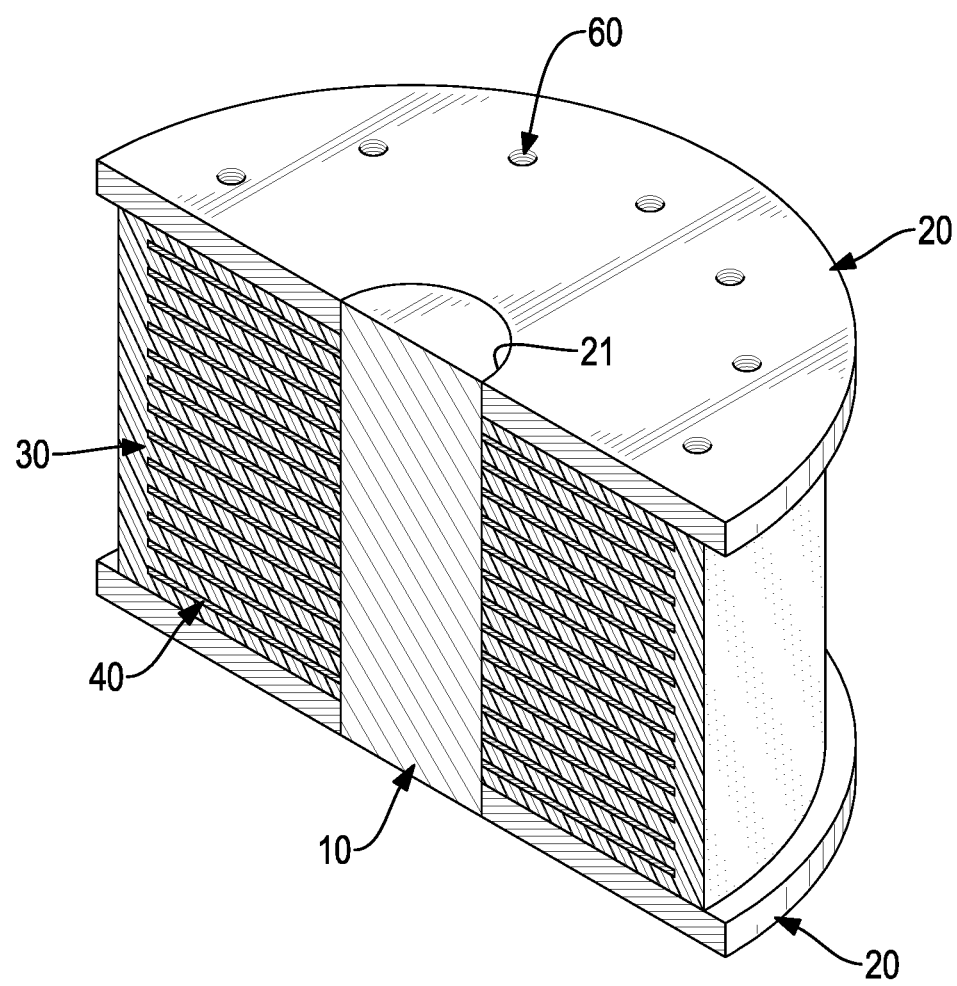
FIG. 1 is a perspective and sectional view of a first embodiment of an isolation energy absorber in accordance with the present invention.
Figure 2:
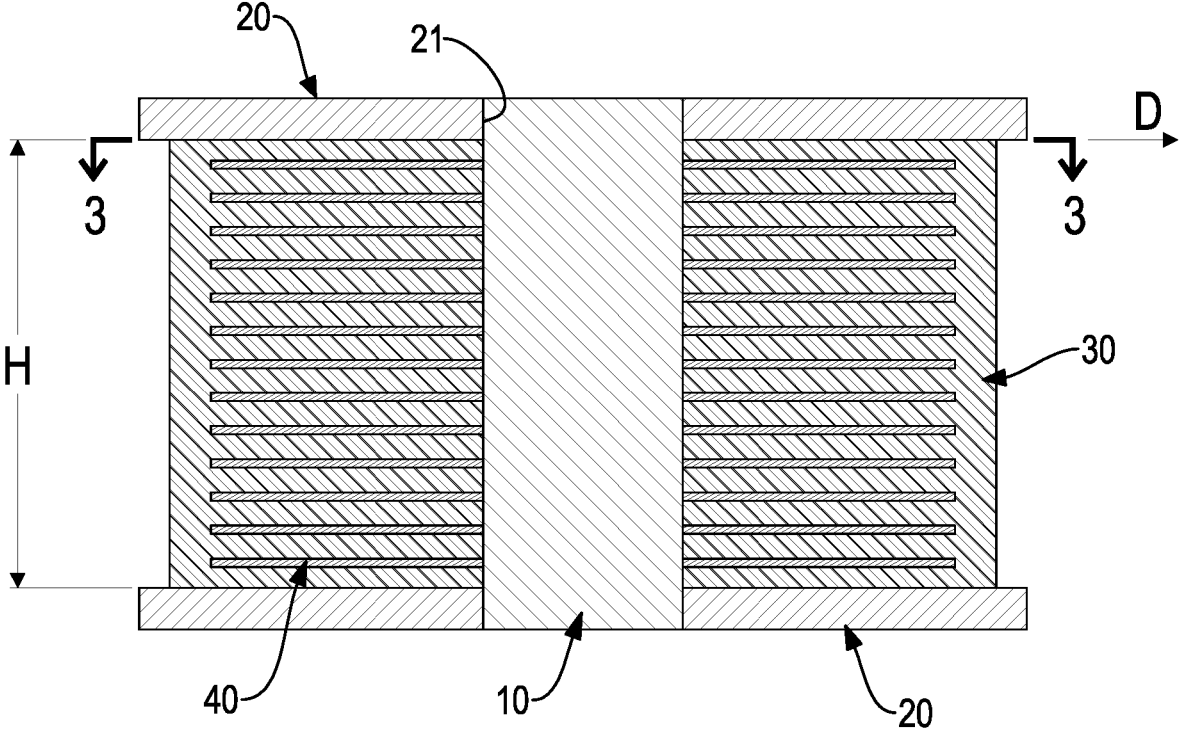
FIG. 2 is a cross sectional side view of the isolation energy absorber in FIG. 1.
Figure 3:
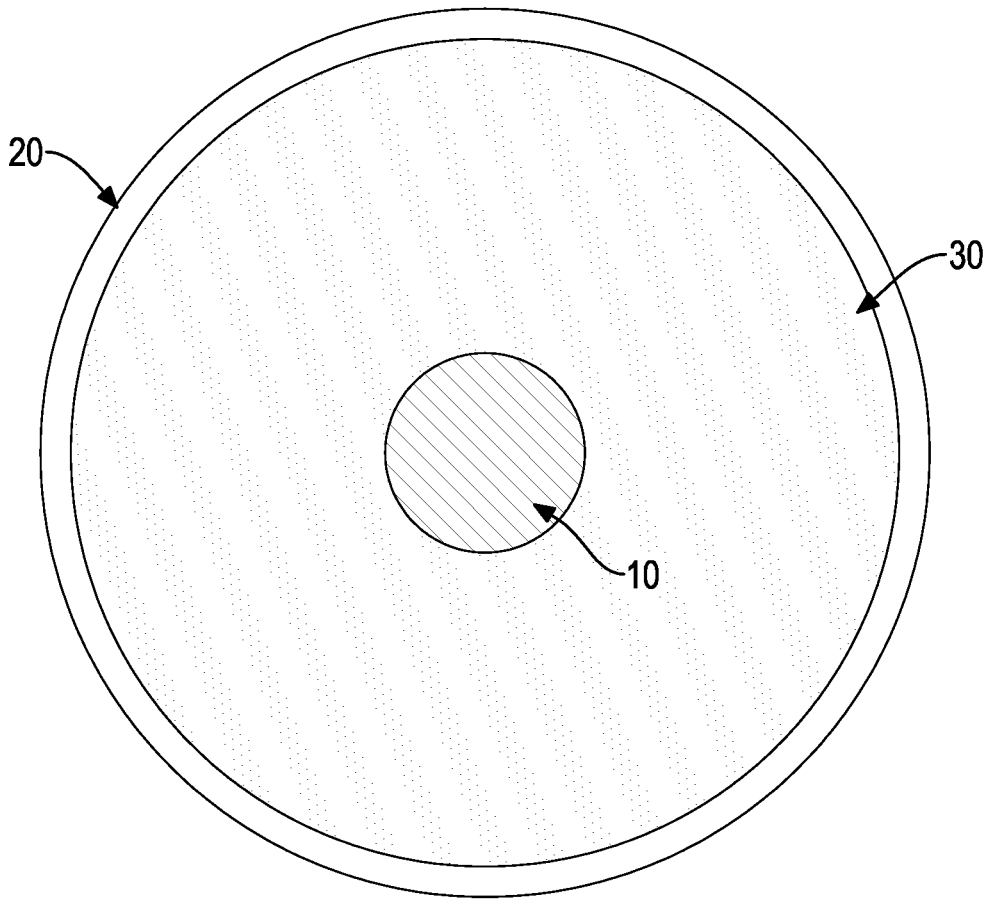
FIG. 3 is a cross sectional top view of the isolation energy absorber across line 3-3 in FIG. 2.

With reference to FIGS. 1 to 3, a first embodiment of an isolation energy absorber in accordance with the present invention is used on buildings, bridges, other large objects, facilities or equipment, and the isolation energy absorber comprises two ends, a core post 10, two supporting boards 20, multiple first material layers 30, and multiple second material layers 40. The core post 10 has a cross section being round, square or in any other geometric shape. The core post 10 is a columnar body and is made of zinc metal or zinc alloy that has been metal smelted to be a ductile material with a shear strain capacity of at least 50%.

Zinc is an environmentally friendly and biodegradable material, and is also an essential element or component for the human body to maintain normal operation. The purity of the zinc metal is more than 99%, defined by mass percentage. For example, the purity of the zinc metal is 99.9%, which means that based on the total mass of the zinc metal (100%), the zinc content accounts for 99.9%, and the rest is the impurities in the zinc metal. Furthermore, zinc metal with a purity of 99% to 99.5% can increase the ability of absorbing vibration energy with less metal smelting procedures but more metal smelting time. Zinc metal with a purity of 99.5% to 99.9% can use less zinc material after metal smelting to increase the ability of absorbing vibration energy in a more economical way. Zinc metal with a purity of 99.9% to 99.98% can use less zinc material in a more economical way to increase the ability of absorbing vibration energy and avoid the damage caused by low cycle fatigue. Zinc metal with a purity of 99.98% to 99.995% can increase ductility and strength after a short period of metal smelting, and can also recrystallize at room temperature to increase the ability of absorbing vibration energy ability and avoid damage caused by low cycle fatigue, and can continue to be used for a long time. Zinc metal with a purity of 99.995% to 100%, itself has greater ductility, and after a shorter period of metal smelting, the strength and ductility can be increased to increase the deformation capacity of the isolation energy absorber and can have a lower recrystallization temperature of the core post 10, which can increase the ability of absorbing vibration energy and avoid damage caused by low cycle fatigue. After an earthquake, zinc can be restored like a new material due to recrystallization at low temperature, and it also has the important function of continuous and long-term use.

Furthermore, based on the total mass of the zinc alloy, the zinc content in the zinc alloy is greater than or equal to 50% mass and less than or equal to 99% mass (i.e., 50% mass≤zinc content≤99% mass). In some embodiments, the zinc alloy may contain zinc and a first additive element or component, and the first additive element or component may contain aluminum, copper, lithium, iron, magnesium, manganese, calcium, zirconium, bismuth, chromium, titanium, germanium, strontium, lead, silver, or combinations thereof, but not limited thereto, allowing the core post 10 to have a lower weight ratio of zinc to increase its ductility. Preferably, the zinc alloy includes zinc and aluminum, based on the total mass of the zinc alloy, the zinc content is 60% mass to 90% mass, and the aluminum content is 10% mass to 40% mass, and the aforementioned zinc alloy can increase the ductility and malleability of the core post. Further, in some embodiments, based on the total mass of the zinc alloy, the zinc content is greater than or equal to 90% mass and less than or equal to 95% mass. In this way, the zinc alloy that meets the aforementioned zinc content can increase the output of the core post 10 and meet the basic needs of the project in a more economical way. In some embodiments, based on the total mass of the zinc alloy, the zinc content is greater than or equal to 95% mass and less than or equal to 99% mass. The zinc alloy that meets the aforementioned zinc content needs to go through multiple metal smelting procedures and requires more time metal smelting to increase its ductility and malleability. Therefore, the mass ratio of the purity of the zinc material of the core post core 10 of the present invention is 60% to less than 100%, so that the zinc metal or zinc alloy can have a lower recrystallization temperature and increases its ductility and malleability, which can increase the ability of absorbing vibration energy, avoid damage caused by low cycle fatigue, and can provide a function of continuous and long-term use.

The two supporting boards 20 are respectively disposed on two ends of the isolation energy absorber, are parallel with each other at a spaced interval, and each one of the supporting boards 20 may be round, square or in any possible shapes. The two supporting boards 20 are respectively connected to the ground and a large object, such as a building, a bridge or a machine. Each one of the supporting boards 20 has a center and a receiving hole 21. The receiving hole 21 is formed through the center of the supporting board 20 and corresponding to and receiving one of the ends of the core post 10. Furthermore, the two supporting boards 20 can be connected with structures, instruments and equipment, foundations, bridge abutments or floors by bolts, welding or rivets, which are not limited in the present invention. With reference to FIG. 1, each one of the two supporting boards 20 has multiple bolt holes 60 disposed annularly on the supporting board 20 at spaced intervals.

The first material layers 30 and the second material layers 40 are alternately mounted between the supporting boards 20 and surround the core post 10, and each one of the first material layers 30 and the second material layers 40 has a shape corresponding to that of the two supporting boards 20 and may be round, square and any possible shape. Alternatively, each one of the first material layers 30 and the second material layers 40 has a shape different from that of the two supporting boards 20. For example, each one of the supporting boards 20 may be square, and each one of the first material layers 30 and the second material layers 40 may be round. The first material layers 30 and the second material layers 40 are made of flexible materials that are different from each other. Preferably, the first material layers 30 may be made of rubber, metal, carbon fiber or composite materials. The second material layers 40 may be made of metal, rubber, carbon fiber or composite materials. The core post 10 extends through the two supporting boards 20, the multiple first material layers 30, and the multiple second material layers 40. In addition, the multiple first material layers 30 may have the same thickness or may have different thicknesses, and the multiple second material layers 40 may have the same thickness or may have different thicknesses.

Figure 9:
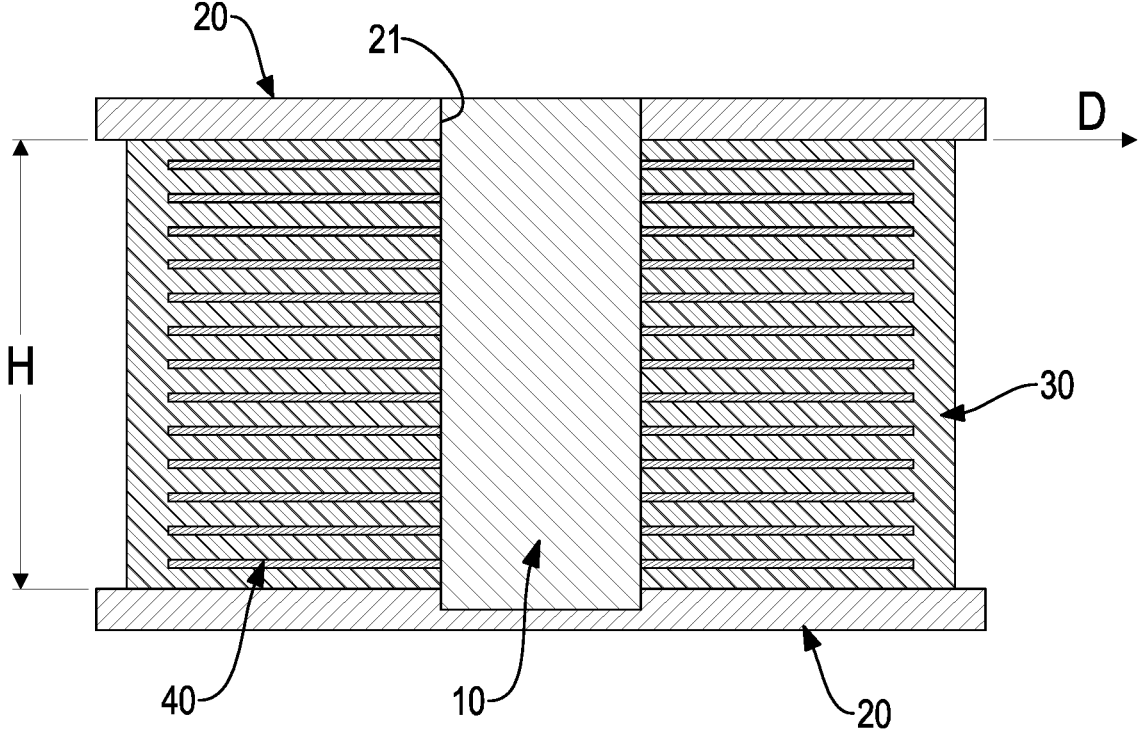
FIG. 9 is a cross sectional side view of a sixth embodiment of an isolation energy absorber in accordance with the present invention.
Figure 10:
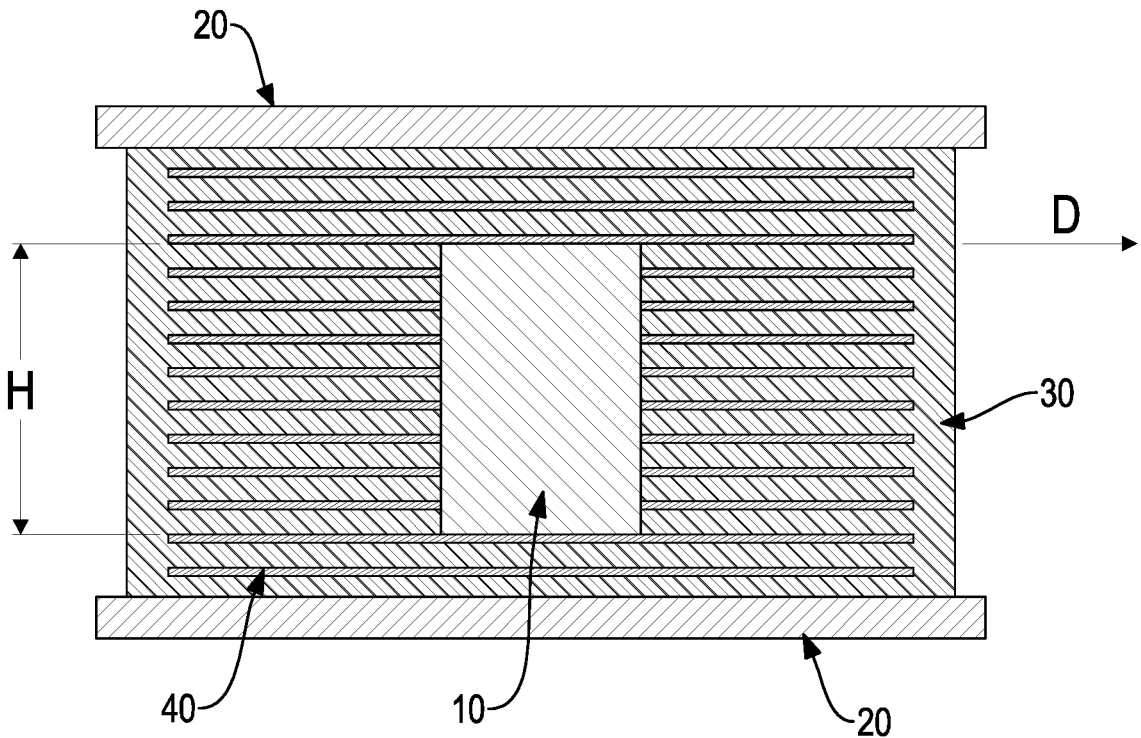
FIG. 10 is a cross sectional side view of a seventh embodiment of an isolation energy absorber in accordance with the present invention.
Figure 11:
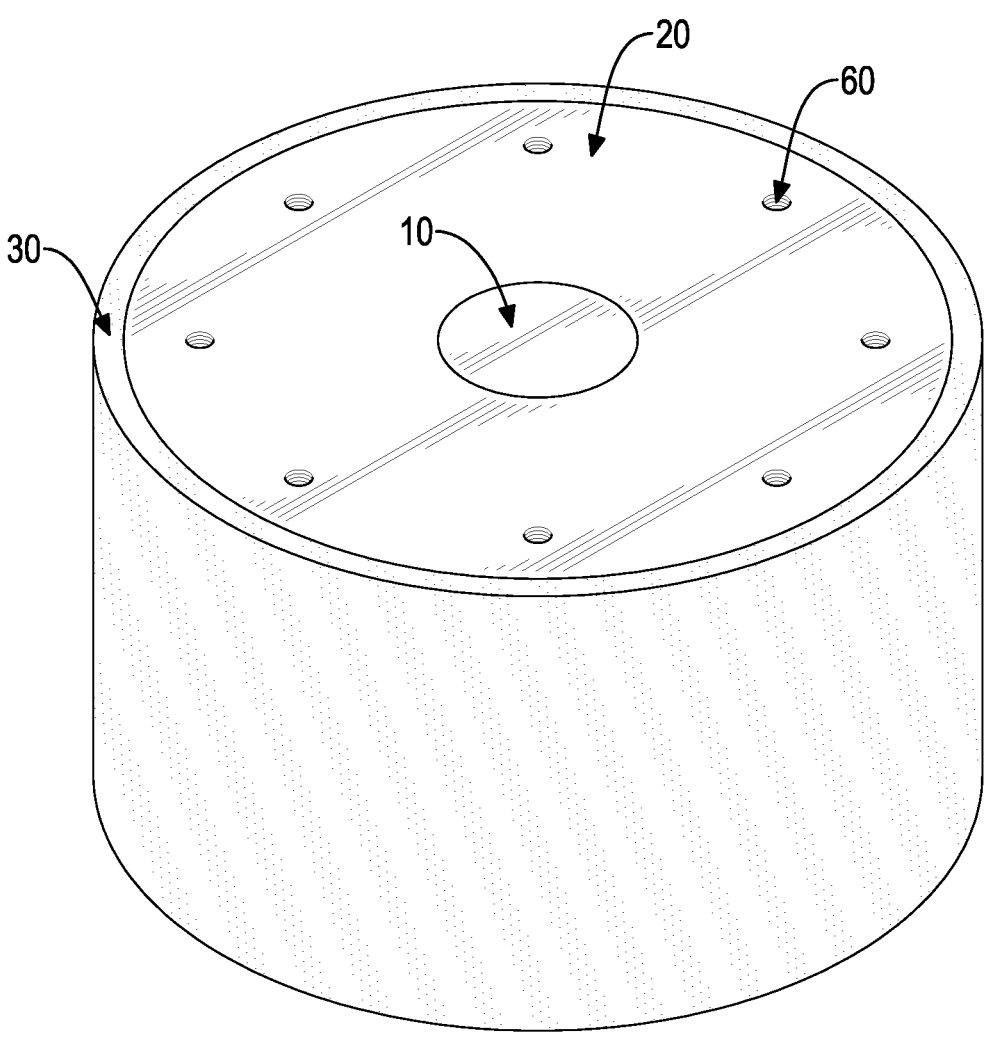
FIG. 11 is a perspective view of an experimental sample in accordance with the present invention, corresponding to the first embodiment of the isolation energy absorber in FIG. 1.
Figure 12:
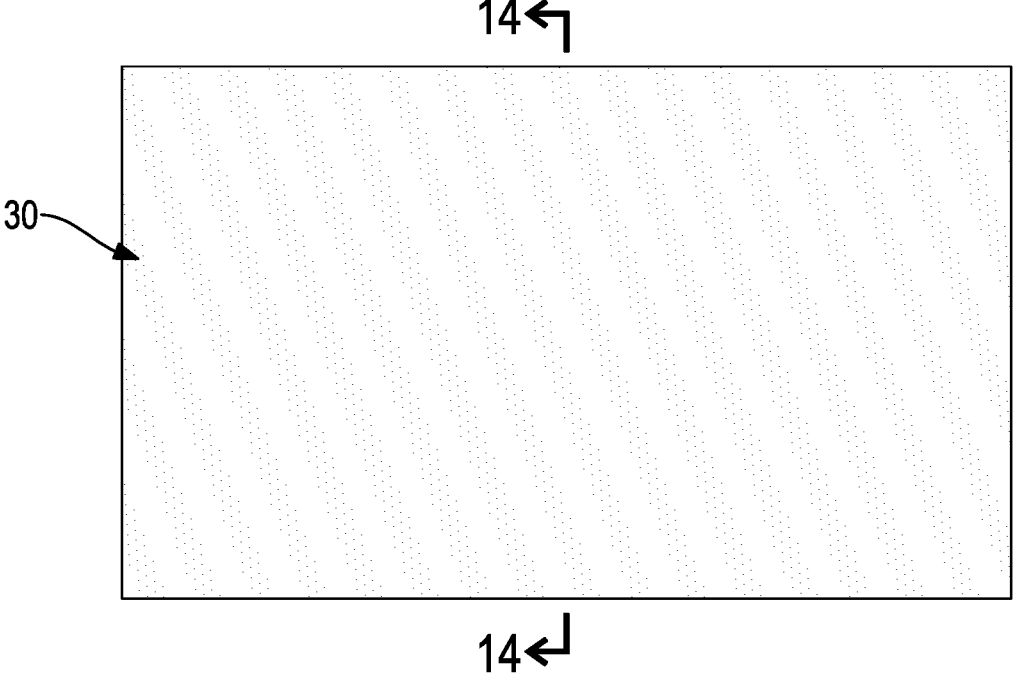
FIG. 12 is a perspective side view of the experimental sample in FIG. 11.
Figure 13:
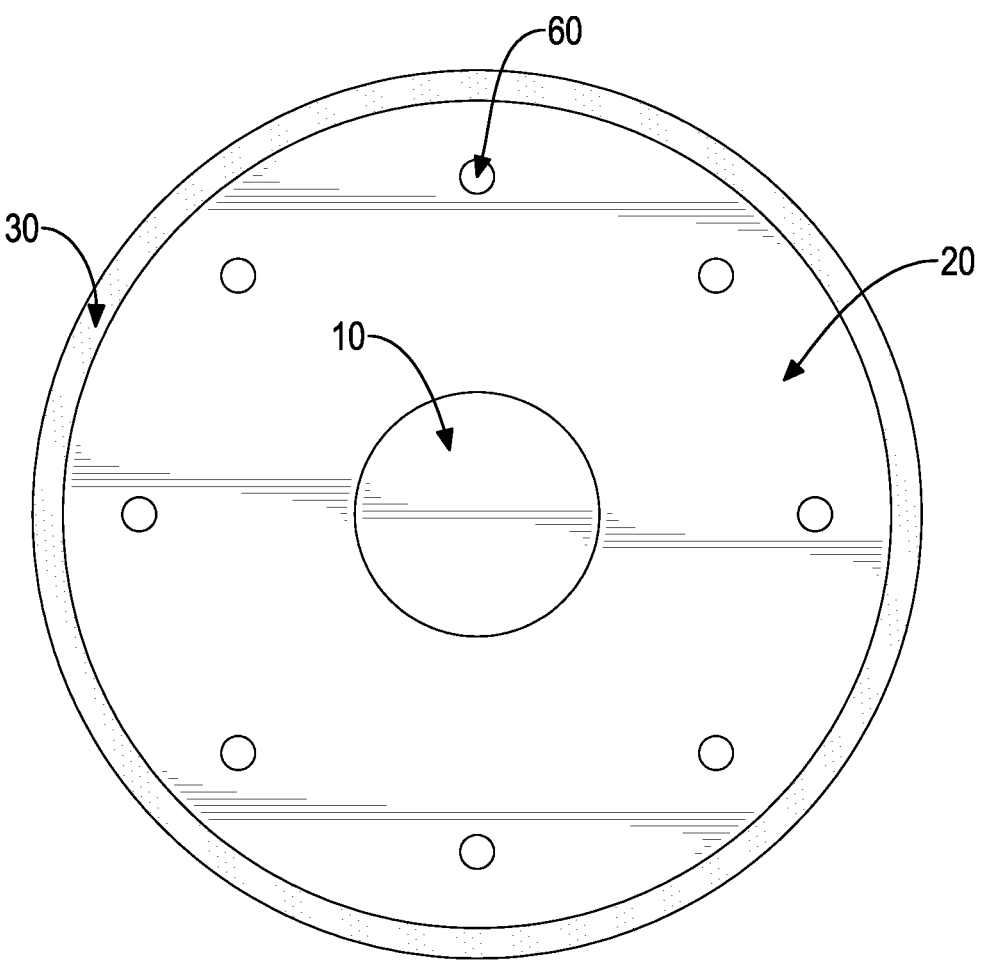
FIG. 13 is a perspective top side view of the experimental sample in FIG. 11.

With reference to FIGS. 2, 9, and 10, the shear strain of the core post 10 is defined as a horizontal deformation or a lateral deformation D of the core post 10 divided by a height H of the core post 10 subjected to shear deformation, that is, D/H. The horizontal deformation or lateral deformation D refers to a relative horizontal displacement or lateral displacement in a horizontal direction between a top end and a bottom end of the core post 10 extending through the first material layers 30 and the second material layers 40. The height H of the core post 10 subjected to shear deformation is the sum of the thicknesses of the first material layers 30 and the second material layers 40 that are extended through by the core post 10.

According to the above-mentioned features and structural relationships, when the isolation energy absorber of the present invention is in use, during earthquakes, deformation of the core post 10, the first material layers 30, and the second material layers 40 can provide a shock-absorbing effect to prevent the earthquake shock and energy directly transmitting to the object such as the buildings, bridges, other large objects, facilities or equipment. Furthermore, the isolation energy absorber of the present invention can provide sufficient damping effect without using with other dampers such as hydraulic dampers, and this can significantly reduce the required costs and is economical, and does not require additional space to accommodate the other dampers and is convenient in use. Additionally, the core post 10 is a columnar body and is made of zinc metal or zinc alloy that has been metal smelted to be a ductile material with a shear strain capacity of at least 50%. Zinc is an environmentally friendly and biodegradable material, and is also an essential element or component for the human body to maintain normal operation. Therefore, when the isolation energy absorber of the present invention reaches the end of its service life and needs to be disassembled, it will not cause environmental pollution problems and complies with environmental protection regulations.

Furthermore, zinc has a high yield stress, high bearing capacity, and large damping. Therefore, the core post 10 made of zinc not only saves materials, but also reduces the displacement of the isolation energy absorber, and greatly improves the damping effect to enhance its isolation function. It also can increase economic benefits and greatly improve engineering applications and economic benefits. In addition, the melting point of zinc is 420° C., which is higher than that of lead (327° C.). Therefore, during an earthquake, when the isolation energy absorber of the present invention absorbs vibration energy, the raised temperature will not reach the melting point of zinc. Therefore, the core post 10 of the present invention will not lose its function during an earthquake, and can effectively maintain the complete functions of the core post 10 and the isolation energy absorber. In addition, since zinc has high specific heat and coefficient of thermal conductivity, its temperature will not easily rise after absorbing vibration energy of an earthquake, so the function of the core post 10 of absorbing vibration energy will not be reduced.

Additionally, zinc or zinc alloy of the core post 10 is annealed (an anneal process) or tempered (a tempering process) at a temperature of 40° C. to 415° C. to increase its ductility and malleability and to obtain different crystal grain sizes to meet the needs of various projects.

Furthermore, the zinc or zinc alloy of the core post 10 is metal smelted by an anneal process or an extrusion process or an equal channel angular pressing (ECAP) or a severe plastic deformation process (SPD) or a hydrostatic extrusion process or a metal rolling process or a die casting process or a thermal-mechanical processing or a spark plasma sintering process or a sintering process or an argon plasma process or a spinning forming process or an axial forming process or a shear forming process, or a flow forming process, or a forging process, or a high pressure torsion process (HPT) or a tempering process, etc. Finally, the core post 10 becomes a ductile material with a shear strain capacity of at least 50%, and thus has better ductility, malleability, and strength to increase the ability of deformation and energy absorption. The material of the core post 10 can be annealed or tempered at a temperature of 40° C. to 415° C. to obtain different crystal grain sizes to meet the needs of various projects.

Further, the zinc metal or zinc alloy is made by metal smelting. The metal smelting method can use pressure or compressive force, shear force, torsion, bending moment, tensile force or a combination of the aforementioned forces. A metal smelting process allows the zinc metal or zinc alloy to produce at least one strain of the same degree or different degrees and time intervals at various temperatures from minus 12° C. to 415° C. (it can be at the same temperature or at different temperatures) to increase its ductility and energy absorption function, thereby improving the ability of absorbing vibration energy of the isolation energy absorber during an earthquake. The metal smelting method of the core post 10 uses a combination of pressure or compressive force and torsion, a combination of pressure or compressive force and shear force, or a combination of pressure or compressive force and bending moment, and can increase the ductility of the core post 10 and the function of absorbing vibration energy. The combinations of the aforementioned forces can be a combination of pressure or compressive force and torsion, a combination of pressure or compressive force and shear force or a combination of pressure or compressive force and bending moment.

Figure 14:
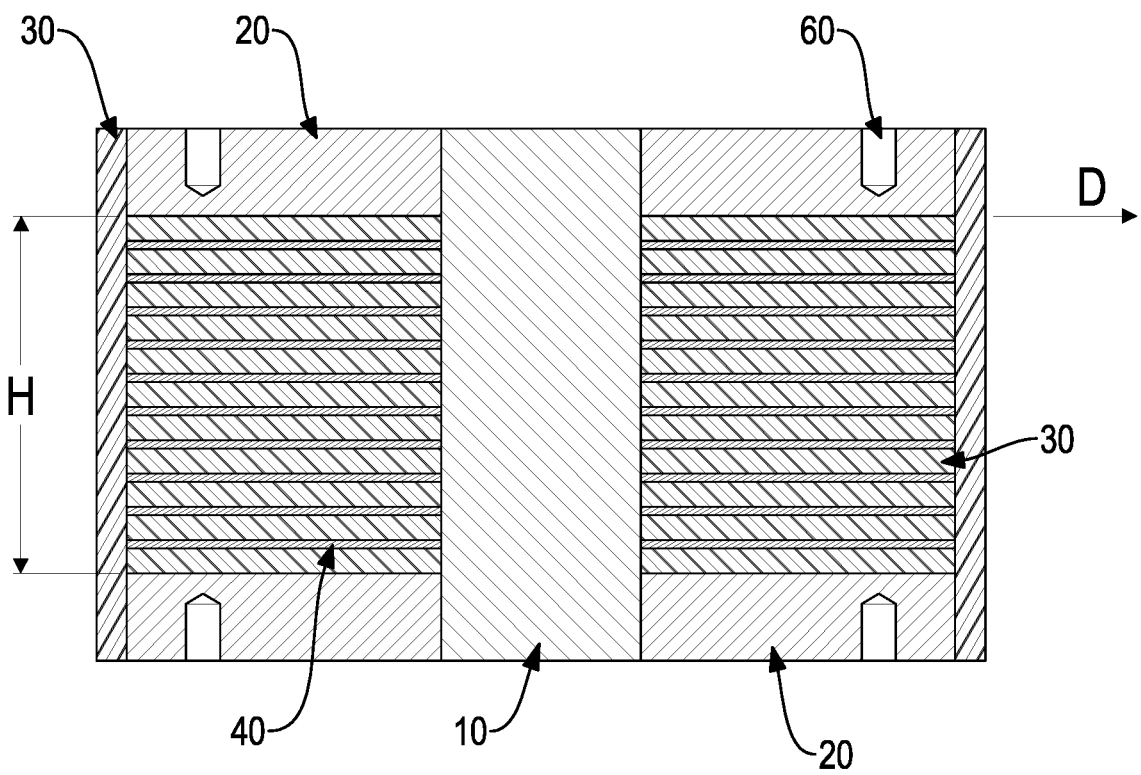
FIG. 14 is a cross sectional side view of the experimental sample along line 14-14 in FIG. 12.
Figure 16:
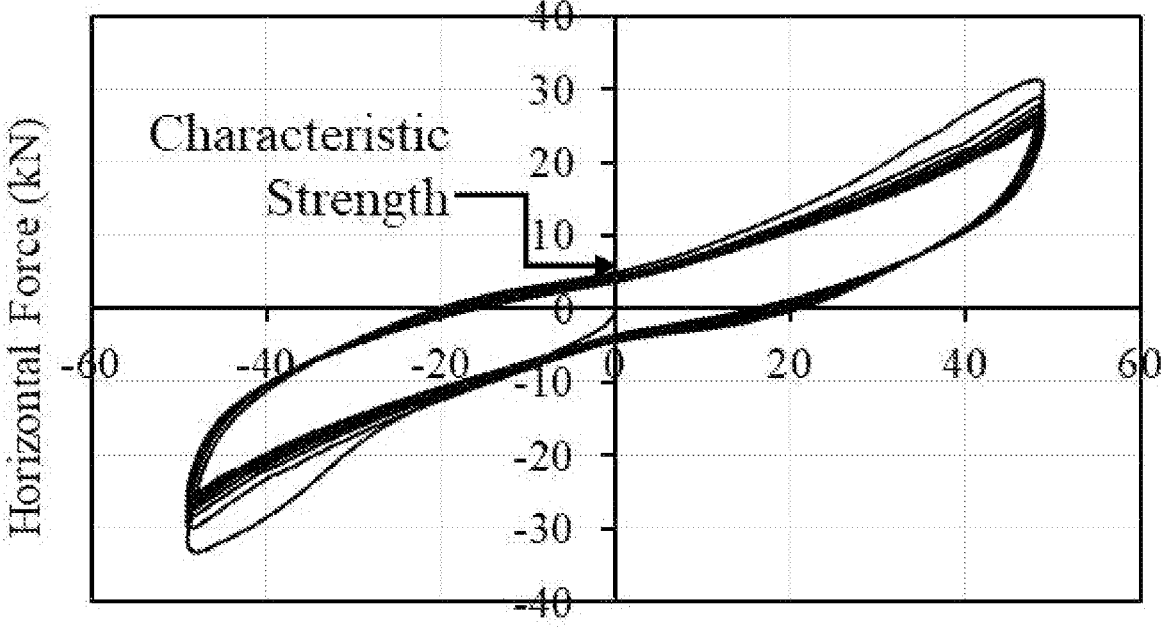
FIG. 16 is a diagram of hysteresis loop of the experimental sample of the present invention with a relative displacement of 49.5 millimeters in a horizontal direction (or lateral direction)
Figure 17:
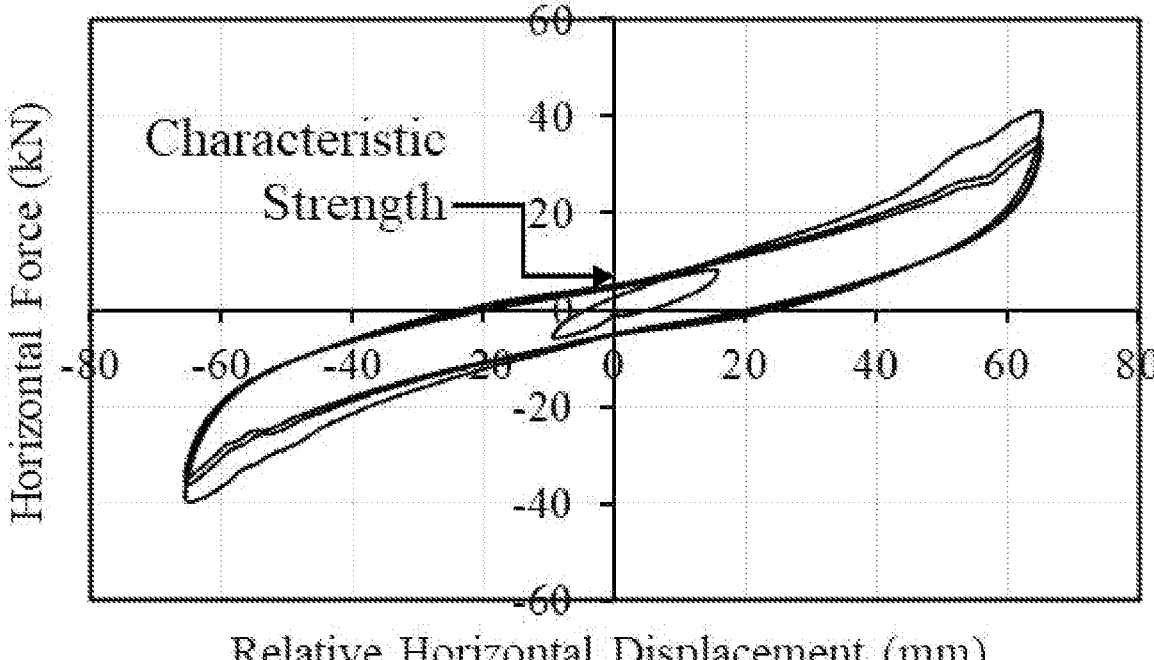
FIG. 17 is a diagram of hysteresis loop of the experimental sample of the present invention with a relative displacement of 66 millimeters in a horizontal direction (or lateral direction).

In order to verify that the present invention uses metal-smelted zinc metal or zinc alloy as the material of the core post 10 to have outstanding important functions and effects, the present invention conducted a series of experiments on the isolation energy absorber of the present invention. With reference to FIGS. 11 to 14, an experimental sample corresponding to the first embodiment of the present invention (the difference between the experimental sample and the first embodiment is that the first material layer 30 is coated on the outside to protect the experimental sample from the weather, and will not affect the actual engineering use function and mechanical behavior of the isolation energy absorber of the present invention) conducts relevant experimental tests. The experimental sample has a diameter of 146 millimeters (mm), a height of 85 millimeters (mm), and a core post 10 made of zinc. With reference to FIG. 14, according to the definition of the height H of the core post 10 subjected to shear deformation, the height H is 53 millimeters (mm), the diameter of the core post 10 is 12.5 millimeters (mm), and the cross-sectional area of the core post 10 is 122.7185 square millimeters (mm²). There are 11 first material layers 30 in total, the thickness of each one of the first material layers 30 is 3 millimeters (mm), and the total thickness of the first material layers 30 is 33 millimeters (mm). Each first material layer 30 is made of rubber and the shear modulus of the rubber is 1.077 MPa (i.e., 10.979 kgf/cm²). There are 10 second material layers 40 in total, the thickness of each one of the second material layers 40 is 2 millimeters (mm), so the total thickness of the second material layers 40 is 20 millimeters (mm). The second material layer 40 is made of steel, the height H of the core post 10 subjected to shear deformation is 53 millimeters (mm, that is, 33 mm+20 mm), and each one of the two supporting boards 20 is made of steel and has a thickness of 16 millimeters (mm). Under a vertical pressure of 10 MPa, FIGS. 15 to 17 show the hysteresis loops between the relative horizontal displacement and the horizontal force or shear force when the isolation energy absorber of the present invention is subjected to different relative horizontal displacements.

During the experiments of the aforementioned experimental sample, the frequency of the cyclic loading in the horizontal direction was set to 0.4 Hz (a period of 2.5 seconds). With reference to FIG. 15, a response of hysteretic loop of the isolation energy absorber (same as the core post 10) of the present invention that is subjected to a relative horizontal displacement of 33 millimeters (mm) (i.e., the horizontal deformation D in FIG. 14), according to the definition of the present invention, the shear strain (D/H) of the zinc core post 10 in the experiment is 33 millimeters (mm)/53 millimeters (mm)=62.264%. According to the definition of the design criteria and instructions for earthquake-isolated bridges of the American Association of State Highway and Transportation Officials (hereinafter referred to as AASHTO), the shear strain of the first material layer 30 is 33 millimeters (mm)/33 millimeters (mm)=100%

(AASHTO has not determined the shear strain of the core post 10 with any definition). With reference to FIG. 16, a response of hysteretic loop of the isolation energy absorber (same as the core post 10) of the present invention that is subjected to a relative horizontal displacement of 49.5 millimeters (mm) (i.e., the horizontal deformation D), according to the definition of the present invention, the shear strain of the zinc core post 10 in the experiment is 49.5 millimeters (mm)/53 millimeters (mm)=93.396%. According to the definition of AASHTO, the shear strain of the first material layer 30 is 49.5 millimeters (mm)/33 millimeters (mm)=150%. With reference to FIG. 17, a response of hysteretic loop of the isolation energy absorber (same as the core post 10) of the present invention that is subjected to a relative horizontal displacement of 66 millimeters (mm) (i.e., the horizontal deformation D), according to the definition of the present invention, the shear strain of the zinc core post 10 in the experiment is 66 millimeters (mm)/53 millimeters (mm)=124.528%. According to the definition of AASHTO, the shear strain of the first material layer 30 is 66 millimeters (mm)/33 millimeters (mm)=200%

Figure 15:
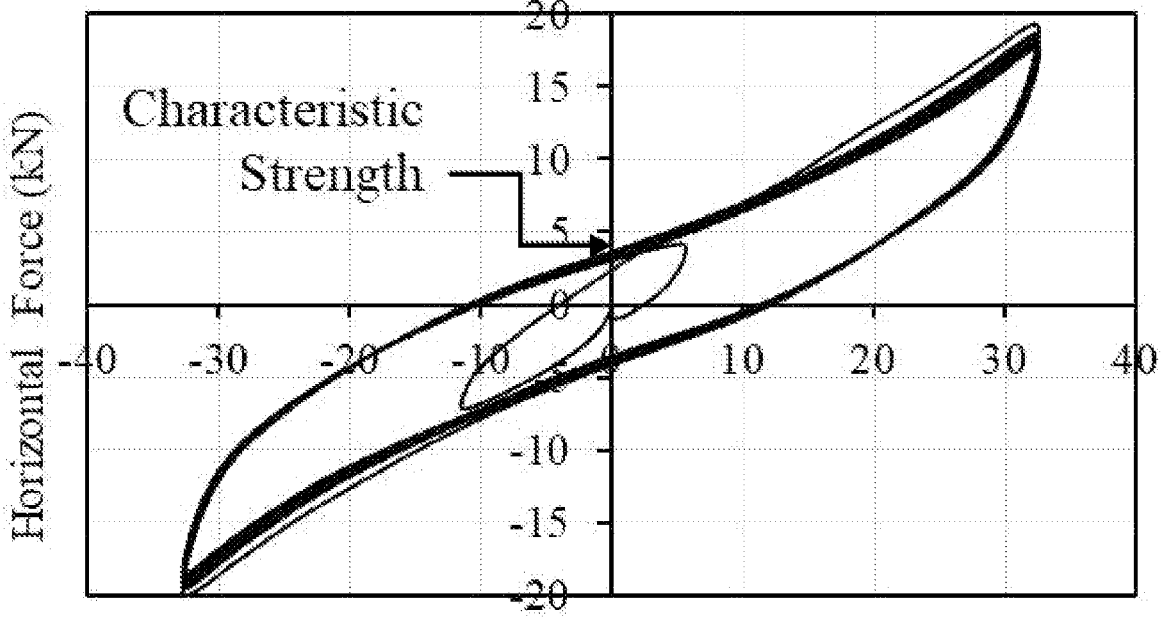
FIG. 15 is a diagram of hysteresis loop of the experimental sample of the present invention with a relative displacement of 33 millimeters in a horizontal direction (or lateral direction)

With reference to FIG. 15, when the relative horizontal displacement is 33 millimeters (mm), the characteristic strength of the isolation energy absorber of the present invention is 3.488 kilonewtons (kN). However, according to the design criteria and instructions for earthquake-isolated bridges of AASHTO, the characteristic strength of Lead Rubber Bearing (LRB) of the same size is only 0.99402 kN (that is, 6.36173×diameter of lead core post×diameter of lead core post N (Newton)=6.36173×12.5×12.5 Newton=994.02 Newton (N)=0.99402 kilonewtons). It can be seen from the aforementioned characteristic strengths that the characteristic strength of the isolation energy absorber of the present invention is about 3.5090 times that of the lead rubber bearing. Furthermore, from the experimental results in FIG. 15, when the relative horizontal displacement is 33 millimeters (mm), the average absorbed energy of the isolation energy absorber of the present invention in each cycle is 469.898 kN-mm. However, according to the definition of AASHTO, the average absorbed energy of the lead rubber bearing of the same size in each cycle is 131.2106 kN-mm. Therefore, the function of the isolation energy absorber of the present invention in absorbing vibration energy is about 3.5812 times that of the lead rubber bearing. Additionally, from the experimental results in FIG. 15, an equivalent effective damping ratio of the isolation energy absorber of the present invention is 12.0874%. However, according to the definition of AASHTO, the equivalent effective damping ratio of the lead rubber bearing of the same size and rubber material (with same shear modulus of 1.077 MPa) is 3.9733%. Therefore, the equivalent effective damping ratio of the isolation energy absorber of the present invention is approximately 3.04216 times that of the lead rubber bearing.

With reference to FIG. 16, when the relative horizontal displacement is 49.5 millimeters (mm), the characteristic strength of the isolation energy absorber of the present invention is 4.447 kilonewtons (kN). However, according to the design criteria and instructions for earthquake-isolated bridges of AASHTO, the characteristic strength of the lead rubber bearing of the same size is only 0.99402 kN. It can be seen from the aforementioned characteristic strengths that the characteristic strength of the isolation energy absorber of the present invention is about 4.4738 times that of the lead rubber bearing. Furthermore, from the experimental results in FIG. 16, the average absorbed energy of the isolation energy absorber of the present invention in each cycle is 1196.2347 kN-mm. However, according to the definition of AASHTO, the average absorbed energy of the lead rubber bearing of the same size in each cycle is 196.8160 kN-mm. Therefore, the function of the isolation energy absorber of the present invention in absorbing vibration energy is about 6.0779 times that of the lead rubber bearing. Additionally, from the experimental results in FIG. 16, the equivalent effective damping ratio of the isolation energy absorber of the present invention is 13.0480%. However, according to the definition of AASHTO, the equivalent effective damping ratio of the lead rubber bearing of the same size and rubber material is 2.7052%. Therefore, the equivalent effective damping ratio of the isolation energy absorber of the present invention is approximately 4.8233 times that of the lead rubber bearing.

With reference to FIG. 17, when the relative horizontal displacement is millimeters (mm), the characteristic strength of the isolation energy absorber of the present invention is 4.850 kilonewtons (kN). However, according to the design criteria and instructions for earthquake-isolated bridges of AASHTO, the characteristic strength of the lead rubber bearing of the same size is only 0.99402 kN. It can be seen from the aforementioned characteristic strengths that the characteristic strength of the isolation energy absorber of the present invention is about 4.8792 times that of the lead rubber bearing. Furthermore, from the experimental results in FIG. 17, the average absorbed energy of the isolation energy absorber of the present invention in each cycle is 1513.0443 kN-mm. However, according to the definition of AASHTO, the average absorbed energy of the lead rubber bearing of the same size in each cycle is 262.4213 kN-mm. Therefore, the function of the isolation energy absorber of the present invention in absorbing vibration energy is about 5.7657 times that of the lead rubber bearing. Additionally, from the experimental results in FIG. 17, the equivalent effective damping ratio of the isolation energy absorber of the present invention is 10.4673%. However, according to the definition of AASHTO, the equivalent effective damping ratio of the lead rubber bearing of the same size and rubber material is 2.05066%. Therefore, the equivalent effective damping ratio of the isolation energy absorber of the present invention is approximately 5.104357 times that of the lead rubber bearing.

In summary, the reactions of the hysteresis loops of the aforementioned experimental sample are sufficient to prove that the isolation energy absorber of the present invention has stable mechanical behavior and good ductility. Compared with the characteristics of the conventional energy absorber with the lead core post, it can also be proved that the isolation energy absorber of the present invention has much higher strength and ability of absorbing vibration energy, and has outstanding effects.

Figure 4:
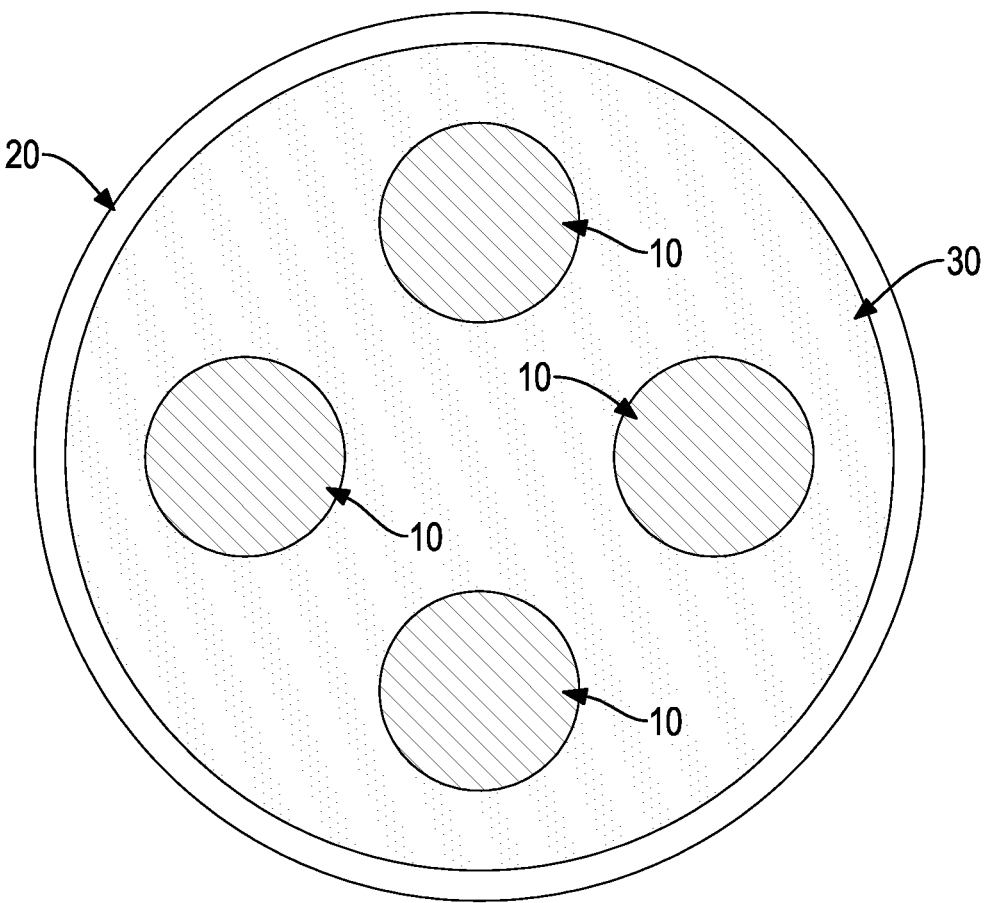
FIG. 4 is a cross sectional top view of a second embodiment of an isolation energy absorber in accordance with the present invention.

With reference to FIG. 4, a second embodiment of an isolation energy absorber in accordance with the present invention is substantially the same as the first embodiment as shown in FIGS. 1 to 3 except for the following features. The isolation energy absorber has multiple core posts 10, and the core posts 10 are implemented and are arranged at spaced intervals relative to a center of the isolation energy absorber to provide a damping effect to the isolation energy absorber by the deformation of the multiple core posts 10.

Figure 5:
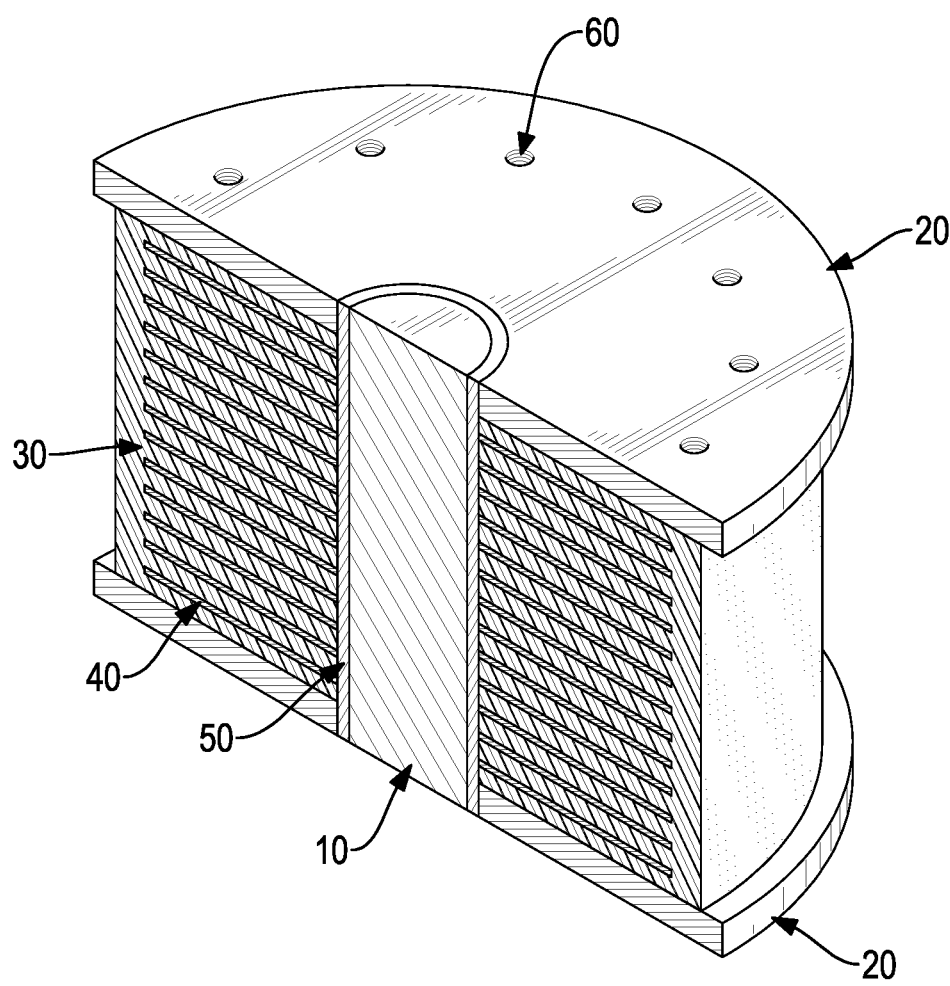
FIG. 5 is a perspective and sectional view of a third embodiment of an isolation energy absorber in accordance with the present invention.
Figure 6:
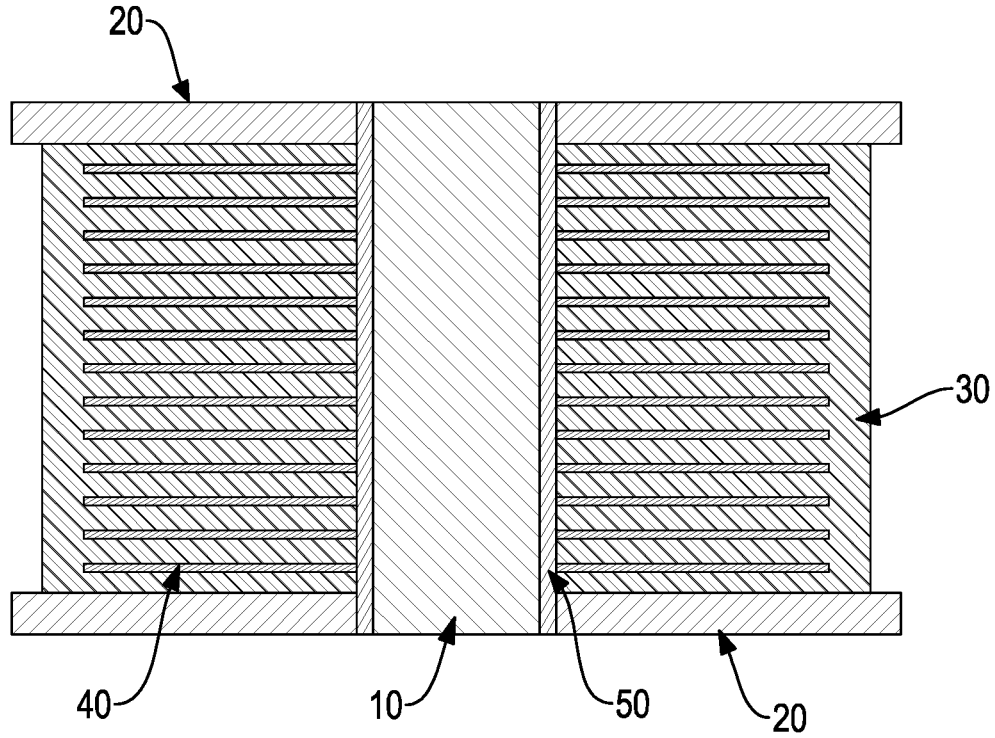
FIG. 6 is a cross sectional side view of the isolation energy absorber in FIG. 5.

With reference to FIGS. 5 and 6, a third embodiment of an isolation energy absorber in accordance with the present invention is substantially the same as the first embodiment as shown in FIGS. 1 to 3 except for the following features. In the third embodiment of the isolation energy absorber of the present invention, the isolation energy absorber has a restricting module 50 mounted on and covering an outer surface of the core post 10, the restricting module 50 located between the core post 10, the material layers 30, 40, and the two supporting boards 20. The restricting module 50 is made of a material that can deform or has a high specific heat to provide a restricting effect and a function of deforming space or suppressing temperature rise. Preferably, the restricting module 50 is made of a deformable soft material, a material with high specific heat, a material with high coefficient of thermal conductivity, is a hollow cylinder or is a helical spring.

Figure 7:
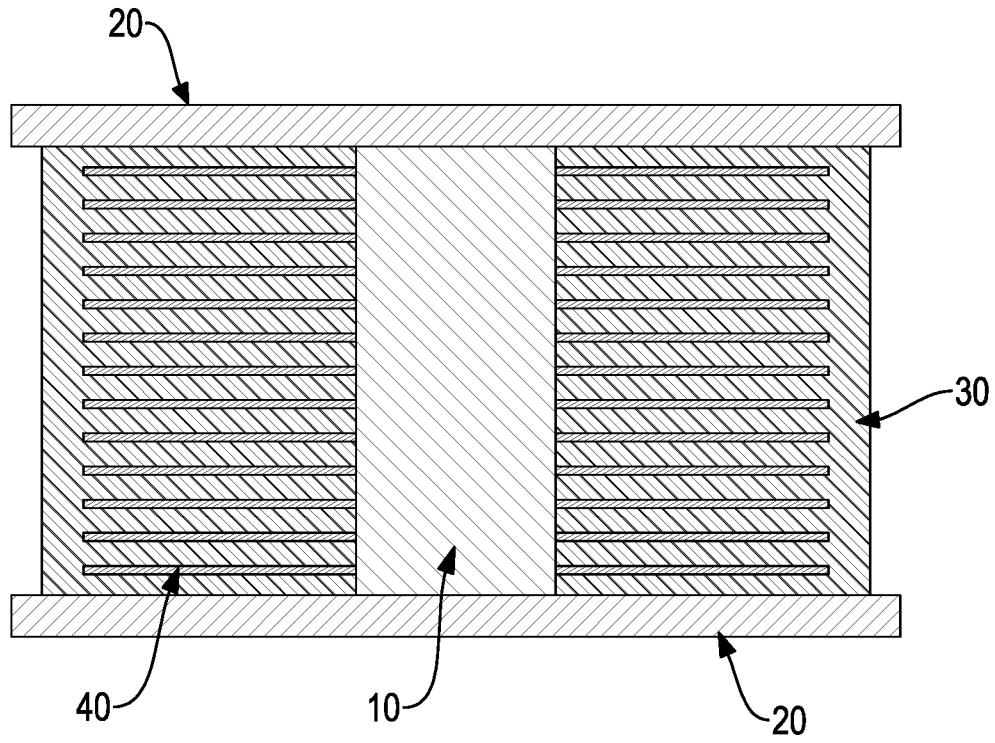
FIG. 7 is a cross sectional side view of a fourth embodiment of an isolation energy absorber in accordance with the present invention.

With reference to FIG. 7, a fourth embodiment of an isolation energy absorber in accordance with the present invention is substantially the same as the first embodiment as shown in FIGS. 1 to 3 except for the following features. In the fourth embodiment of the isolation energy absorber of the present invention, the core post 10 extends through the first material layers 30 and the second material layers 40 without extending through the two supporting boards 20.

Figure 8:
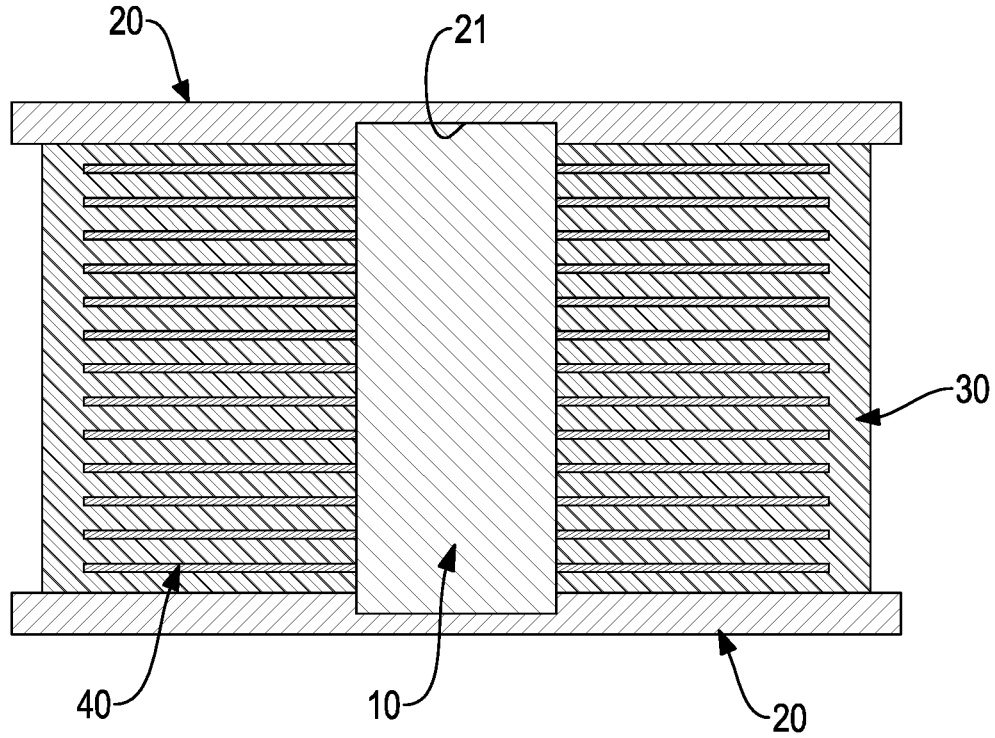
FIG. 8 is a cross sectional side view of a fifth embodiment of an isolation energy absorber in accordance with the present invention.

With reference to FIG. 8, a fifth embodiment of an isolation energy absorber in accordance with the present invention is substantially the same as the first embodiment as shown in FIGS. 1 to 3 except for the following features. In the fifth embodiment of the isolation energy absorber of the present invention, the core post 10 extends through the first material layers 30, the second material layers 40, and a part of thicknesses of the two supporting boards 20.

With reference to FIG. 9, a sixth embodiment of an isolation energy absorber in accordance with the present invention is substantially the same as the first embodiment as shown in FIGS. 1 to 3 except for the following features. In the sixth embodiment of the isolation energy absorber of the present invention, the core post 10 extends through the first material layers 30, the second material layers 40, one of the two supporting boards 20, and a part of thickness of the other one of the two supporting boards 20.

With reference to FIG. 10, a seventh embodiment of an isolation energy absorber in accordance with the present invention is substantially the same as the first embodiment as shown in FIGS. 1 to 3 except for the following features. In the seventh embodiment of the isolation energy absorber of the present invention, the core post 10 extends through a part of the first material layers 30 and the second material layers 40.

According to the above-mentioned technical features, the isolation energy absorber in accordance with the present invention has the following advantages and effects:

First, shock-absorbing effect: when the isolation energy absorber of the present invention is in use, the two supporting boards 20 are respectively connected to the ground and an object. During earthquakes, deformation of the core post 10, the first material layers 30, and the second material layers 40 can provide a shock-absorbing effect to prevent the earthquake shock and energy directly transmitting to the object such as the buildings, bridges, other large objects, facilities or equipment. Furthermore, the isolation energy absorber of the present invention can provide sufficient damping effect without using with other dampers such as hydraulic dampers, and this can significantly reduce the required costs and is economical, and does not require additional space to accommodate the other dampers and is convenient in use.

Second, compliance with environmental protection: the core post 10 of the isolation energy absorber of the present invention is made of zinc metal or zinc alloy. Zinc is an environmentally friendly and biodegradable material, and is also an essential element or component for the human body to maintain normal operation. Therefore, when the isolation energy absorber of the present invention reaches the end of its service life and needs to be disassembled, it will not cause environmental pollution and complies with environmental protection regulations.

Third, improving damping effect: the core post 10 of the isolation energy absorber of the present invention is made of zinc metal or zinc alloy, as zinc has a high yield stress, high bearing capacity, and large damping. Therefore, the core post 10 made of zinc can not only save materials, but also reduce the displacement of the isolation energy absorber, and can greatly improve the damping effect to enhance its isolation function. It also can increase economic benefits and greatly improve engineering applications and economic benefits.

Fourth, maintaining complete function: the core post 10 of the isolation energy absorber of the present invention is made of zinc metal or zinc alloy, and the melting point of zinc is 420° C., which is higher than that of lead (327° C.). Therefore, during an earthquake, when the isolation energy absorber of the present invention absorbs vibration energy, the raised temperature will not reach the melting point of zinc. Therefore, the core post 10 of the present invention will not lose its function during an earthquake, and can effectively maintain the complete functions of the core post 10 and the isolation energy absorber.

Fifth, suppressing temperature rise: the core post 10 of the isolation energy absorber of the present invention is made of zinc metal or zinc alloy, as zinc has high specific heat and coefficient of thermal conductivity, its temperature will not easily rise after absorbing vibration energy of an earthquake, so the function of the core post 10 of absorbing vibration energy will not be affected.

Sixth, recrystallizing at low temperature: zinc metal or zinc alloy can be recrystallized at minus 12° C. and change its properties from a brittle material with poor mechanical properties to a ductile material with quite good mechanical properties. The core post 10 of the isolation energy absorber of the present invention uses the zinc metal or zinc alloy with a mass percentage to enable the core post 10 to recrystallize at low temperature and to increase its ductility. In particular, a zinc alloy with a zinc content of 60% mass to 90% mass and an aluminum content of 40% mass to 10% mass has quite good ductility. Moreover, the core post 10 can be recrystallized at low temperatures, and almost no damage of low cycle fatigue will occur after absorbing energy of an earthquake. Moreover, its properties are changed from a brittle material with poor mechanical properties (elongation strain, less than 10%) to a ductile material with quite good mechanical properties, which can meet the basic requirements of earthquake energy absorption.

Seventh, preferred ductility and strength: the core post 10 of the isolation energy absorber of the present invention is made of zinc metal or zinc alloy, and the zinc metal or zinc alloy is made by metal smelting. The metal smelted process includes an anneal process, an extrusion process, an equal channel angular pressing (ECAP), a severe plastic deformation process (SPD), a hydrostatic extrusion process, a metal rolling process, a die casting process, a thermal-mechanical processing, a spark plasma sintering process, a sintering process, an argon plasma process, a spinning forming process, an axial forming process, a shear forming process, a flow forming process, a forging process, a high pressure torsion process (HPT), or a tempering process, etc. After the metal smelting process, the core post 10 is changed from a brittle material with poor mechanical properties (elongation strain, less than 10%) to a ductile material with a shear strain capacity of at least 50%. Additionally, the metal smelting method can use pressure or compressive force, shear force, torsion, bending moment, tensile force or a combination of the aforementioned forces. A metal smelting process allows the zinc metal or zinc alloy to produce at least one strain of the same degree or different degrees and time intervals at various temperatures to increase its ductility and energy absorption function, thereby improving the ability of absorbing vibration energy of the isolation energy absorber during an earthquake.

Eighth, increasing stability: since the strength of zinc is greater than that of lead and tin, the diameter required to make the zinc core post 10 is smaller than the diameter of the lead core post and the tin core post. Therefore, the aperture of the receiving hole 21 of the isolation energy absorber of the present invention is smaller, which can effectively improve the structural stability of the entire isolation energy absorber.

According to the above-mentioned features and structural relationships of the isolation energy absorber in accordance with the present invention, the deformation of the core post 10 can provide a damping effect, and the first and second material layers 30, 40 can be deformed to provide a shock-absorbing effect to prevent the earthquake shock and energy directly transmitting to the object such as the buildings, bridges, other large objects, facilities or equipment. Furthermore, the core post 10 that is made of zinc metal or zinc alloy has a higher melting point, specific heat and coefficient of thermal conductivity to prevent the temperature rise induced by the heat that is generated by the repeated deformation from impairing the function of the core post 10 or even melting the core post 10 to result in a significant impact and generate pollution to the environment. Furthermore, the zinc metal or zinc alloy can be recrystallized at low temperature, after absorbing the energy of an earthquake, there is almost no damage of low cycle fatigue, and its properties change from a brittle material with poor mechanical properties to a ductile material with quite good mechanical properties, which can meet the basic requirements of earthquake energy absorption. In addition, in the present invention, the zinc metal or zinc alloy of the core post 10 is processed by at least one metal smelting process of the same degree or different degrees of strains and time intervals to increase its ductility and energy absorption function. Then the isolation energy absorber of the present invention has better strength to increase the ability to deform and absorb energy, thereby improving the function of absorbing vibration energy of the isolation energy absorber of the present invention during earthquakes. Additionally, the restricting module 50 is mounted in each core post 10 to provide a restricting effect and a function of deforming space or suppressing temperature rise to the core post 10 to improve the shock-absorbing effect of the isolation energy absorber of the present invention. The present invention provides an isolation energy absorber that is environmentally friendly, has good damping effect, maintains complete functions, suppresses temperature rise, and has a preferred shock-absorbing effect.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An isolation energy absorber comprising:

two ends;

at least one core post being a columnar body and being made of zine metal or zine alloy that has been metal processed to have a shear strain capacity of at least 50%, and to change mechanical properties of the at least one core post from brittle to ductile;

two supporting boards respectively disposed on two ends of the isolation energy absorber at a spaced interval; and multiple first material layers and multiple second material layers alternately mounted between the two supporting boards and surrounding the at least one core post.

2. The isolation energy absorber as claimed in claim 1, wherein one single said core post is implemented.

3. The isolation energy absorber as claimed in claim 1, wherein multiple said core posts are implemented.

4. The isolation energy absorber as claimed in claim 1, wherein the at least one core post extends through the first material layers and the second material layers.

5. The isolation energy absorber as claimed in claim 1, wherein the at least one core post extends through the two supporting boards, the first material layers, and the second material layers.

6. The isolation energy absorber as claimed in claim 1, wherein the at least one core post extends through a part of the first material layers and the second material layers.

7. The isolation energy absorber as claimed in claim 1, wherein the first material layers have a same thickness.

8. The isolation energy absorber as claimed in claim 1, wherein the second material layers have a same thickness.

9. The isolation energy absorber as claimed in claim 1, wherein at least one of the first material layers has a thickness being different from a thickness of the rest of the first material layers.

10. The isolation energy absorber as claimed in claim 1, wherein at least one of the second material layers has a thickness being different from a thickness of the rest of the second material layers.

11. The isolation energy absorber as claimed in claim 4, wherein at least one of the second material layers has a thickness being different from a thickness of the rest of the second material layers.

12. The isolation energy absorber as claimed in claim 5, wherein at least one of the second material layers has a thickness being different from a thickness of the rest of the second material layers.

13. The isolation energy absorber as claimed in claim 1, wherein a restricting module is mounted on and covering an outer surface of the at least one core post, the restricting module located between the at least one core post, the first material layers, and the second material layers.

14. The isolation energy absorber as claimed in claim 1, wherein the at least one core post extends through the first material layers, the second material layers, and a part of one of the two supporting boards.

15. The isolation energy absorber as claimed in claim 1, wherein the at least one core post extends through the first material layers, the second material layers, and a part of the two supporting boards.

16. The isolation energy absorber as claimed in claim 1, wherein the at least one core post extends through the first material layers, the second material layers, one of the two supporting boards, and a part of the other one of the two supporting boards.

17. The isolation energy absorber as claimed in claim 1, wherein a mass ratio of purity of zine of the at least one core post is at least 60%.

18. The isolation energy absorber as claimed in claim 1, wherein the zinc metal or zinc alloy is metal smelted by an anneal process, an extrusion process, an equal channel angular press, a severe plastic deformation process, a hydrostatic extrusion process, a metal rolling process, a die casting process, a thermal-mechanical processing, a spark plasma sintering process, a sintering process, an argon plasma process, a spinning forming process, an axial forming process, a shear forming process, a flow forming process, a forging process, a high pressure torsion process or a tempering process.

19. The isolation energy absorber as claimed in claim 1, wherein the at least one core post is made of the zinc alloy, and based on a total mass of the zinc alloy, a zinc content in the zinc alloy is greater than or equal to 50% mass and less than or equal to 99% mass.

20. The isolation energy absorber as claimed in claim 19, wherein the zinc alloy contains zinc and a first additive element or component, and the first additive element or component contains aluminum, copper, lithium, iron, magnesium, manganese, calcium, zirconium, bismuth, chromium, titanium, germanium, strontium, lead, silver, or combinations thereof.

21. The isolation energy absorber as claimed in claim 19, wherein based on the total mass of the zinc alloy, the zine content in the zine alloy is greater than or equal to 60% mass and less than or equal to 90% mass.

22. The isolation energy absorber as claimed in claim 1, wherein the at least one core post is made of the zinc metal, and the purity of the zinc metal is over 99%.

23. The isolation energy absorber as claimed in claim 22, wherein the purity of the zinc metal is 99% to 99.5%.

24. The isolation energy absorber as claimed in claim 22, wherein the purity of the zinc metal is 99.5% to 99.9%.

25. The isolation energy absorber as claimed in claim 22, wherein the purity of the zinc metal is 99.9% to 99.98%.

26. The isolation energy absorber as claimed in claim 22, wherein the purity of the zine metal is 99.98% to 99.995%.

27. The isolation energy absorber as claimed in claim 22, wherein the purity of the zinc metal is 99.995% to 100%.

28. The isolation energy absorber as claimed in claim 1, wherein the zinc metal and the zinc alloy of the at least one core post are metal smelted by pressure or compressive force, shear force, torsion, bending moment, tensile force or a combination of the aforementioned forces.

29. The isolation energy absorber as claimed in claim 1, wherein the zinc metal and the zinc alloy of the at least one core post are metal smelted by a combination of pressure or compressive force and torsion.

30. The isolation energy absorber as claimed in claim 1, wherein the zine metal and the zinc alloy of the at least one core post are metal smelted by a combination of pressure or compressive force and shear force.

31. The isolation energy absorber as claimed in claim 1, wherein the zinc metal and the zinc alloy of the at least one core post are metal smelted by a combination of pressure or compressive force and bending moment.

* * * * *